No. 609,553. Patented Aug. 23, 1898.
A. D. LLOYD.
FOLDING TENT.
(Application filed Apr. 8, 1898.)
(No Model.)

Witnesses,

Inventor
Arthur D. Lloyd

United States Patent Office.

ARTHUR D. LLOYD, OF SAN FRANCISCO, CALIFORNIA.

FOLDING TENT.

SPECIFICATION forming part of Letters Patent No. 609,553, dated August 23, 1898.

Application filed April 8, 1898. Serial No. 676,890. (No model.)

*To all whom it may concern:*

Be it known that I, ARTHUR D. LLOYD, a citizen of the United States, residing in the city and county of San Francisco, State of California, have invented an Improvement in Folding Tents; and I hereby declare the following to be a full, clear, and exact description of the same.

My invention relates to a construction for tents especially designed as shelter-tents for one or two persons.

It consists, essentially, of a framework of rods hinged and radiating from a common center about which they are turnable, transverse bars uniting the outer ends of the rods in pairs, forming a support for the extensible tent-covering which is secured to each set of arms, so as to be extensible and foldable with relation to the hinge-point, and, in conjunction with these, of transversely-foldable hinges by which the side rods may be folded in upon the transverse rods and the whole converted into a small package. In conjunction with this is a means for retaining the tent in position after the occupant has entered it and a means for ventilating the same.

It also comprises details of construction which will be more fully explained by reference to the accompanying drawings, in which—

Figure 1:
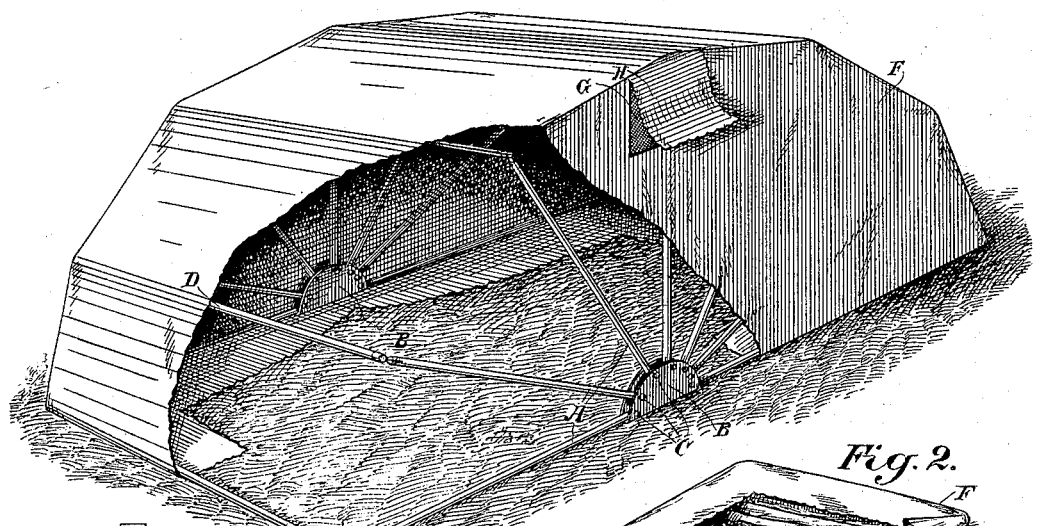
Figure 2:
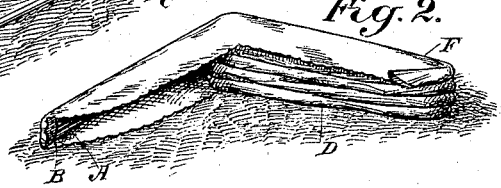
Figure 3:
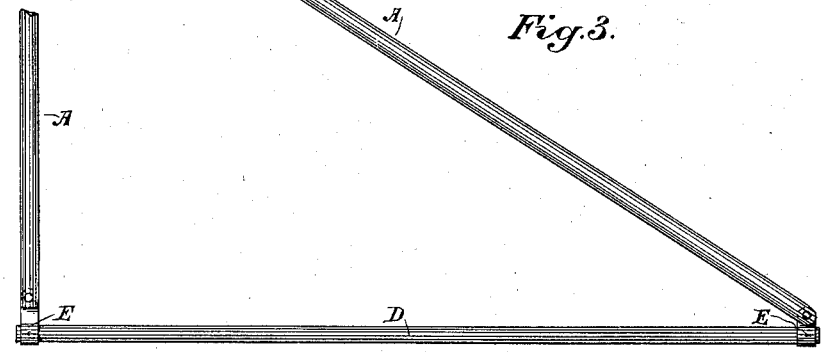
Figure 4:
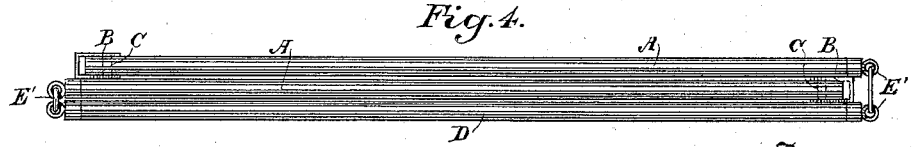

Figure 1 is a view of the tent being spread out. Fig. 2 shows the tent partly folded up for packing. Figs. 3 and 4 are views of the frame of the tent.

The object of my invention is to provide an easily-transportable shelter-tent combining in one structure the covering material and extending framework, and, in conjunction therewith, of means for folding it into a small compass for transportation.

The framework of the tent consists of a series of rods A, which meet and are pivoted at the lower end in a segment or arc B, preferably made of metal and so channeled that the ends of the rods A can enter the channel formed within the curved upper edge of the segment. This may be well constructed by simply bending a sheet of metal so as to form the necessary width of channel after cutting it into the desired shape for the upper open edge. The rods are introduced into this channel and are movably secured or hinged therein by pivot-pins or rivets C, passing through the sides of the base-plate and the rods, so that the rods may be turned independently about their pivot-pins. The opposite ends of the rods are connected with transverse rods D, so that each pair of rods A and the transverse rod D form a rib for the proposed tent. The length of the transverse rod D determines the width of the tent.

I prefer in making the tent for a single person to make the rods of approximately the same length, the rods D being sufficiently longer than the rods A to allow the rods A to fold in on the rods D. In order to thus fold these rods together, I have shown hinges E, by which the rods A and D are united. These hinges may either be in the form of metallic plates secured to one of the rods and pivotally connected with the other, or they may be in the form of screw-eyes E', one attached to the end of each of the rods and the two being linked together. This form of joint will serve to allow one of the rods A to fold upon the rod D, and in order to allow the other rod to fold exterior to the rod A which has already been folded upon D it will be necessary to make the hinge or link longer. If made in the form first described, the shank of the link may be sufficiently longer to allow the last rod A to fold over the first one, or if the hinges be formed with screw-eyes I insert a supplemental link, which connects the two screw-eyes and separates them a sufficient distance to allow the folding of the last rod A exterior to the first one. It will be manifest these hinges may be made in various ways for producing this result, the essential feature being to allow each set of rods to fold one upon the other.

The covering material F may be made of light drilling or canvas, if it is to be used in a dry or warm climate, or it may be made of cloth or other flexible material rendered impervious to water by any suitable coating, such as oil, rubber, &c. This covering is made of such a length that it allows the rods A to be separated at their outer ends, turning about their pivot-points until the first rod at one side will lie upon the ground, the others forming an arch over to the opposite side, where the last rod will also lie upon the ground, the whole forming a semicircle.

The covering is fastened to each set of rods at such intervals that it will extend over the whole semicircle and rest upon the ground at each end. The sides are correspondingly semicircular in shape and sewed or otherwise secured to the top portion and so attached to the rods that they extend down to the ground on each side, thus forming a complete shelter. The ends of the top portion and the lower sides of the side portions are extended sufficiently so that when the tent is opened out these sides and ends will lie upon the ground, projecting a considerable distance into the interior of the tent thus formed. The mattress of the occupant being laid upon these inwardly-folding edges will, when the occupant lies upon it, serve to hold the tent in place and prevent its being blown over or otherwise removed.

If preferred, suitable eyes or rings could be fixed in the material around the lower edges and tent-pegs driven in around the inner side to hold it in place. The occupant of the tent has only to place the apparatus upon the ground, the sides being first opened out so as to stand at right angles with the transverse bars, and then, sitting down upon the ground or upon the mattress, which has already been laid with one end resting upon the inturned end of the canvas, the apparatus can be pulled over the occupant, unfolding as it is pulled over, until the last of the transverse bars D rests upon the ground behind the occupant. The flap can then be drawn under the head of the occupant, and the occupant lying down will be covered by an arch of a length and height depending upon the length of the side rods A. These of course would be made at least one-half the length of the proposed occupant.

In order to properly ventilate the tent and at the same time prevent the ingress of insects, a window or opening is formed upon one or both sides and is afterward covered with a thin comparatively open woven fabric G, which will admit the air without allowing insects to penetrate. Another flap H may be arranged to fall down over either one or both of these inner coverings.

When the device is to be transported, it is only necessary to turn the radiating frameworks backward about their central hinge-points until they lie close together, the covering fabric being folded at the same time, and after this is done the two sides composed of the bars A are folded one on top of the other, lying upon the transverse bars D, and the whole apparatus is then folded into small compass and can be tied or otherwise secured for transportation.

Having thus described my invention, what I claim as new, and desire to secure by Letters Patent, is—

1. A folding tent composed of rods pivoted at one end to common center pieces and radiating outwardly therefrom, separate transverse bars uniting the outer ends of these rods in pairs and having a length to form the proposed width of the tent, transversely-jointed hinges uniting the radial and transverse bars whereby they may be folded upon the transverse bar and upon each other, and a covering attached to the transverse and side bars so as to be extensible and foldable in unison therewith.

2. A shelter-tent consisting of side bars hinged to a common center, separate transverse bars uniting each pair of side bars, flexible inwardly-folding joints whereby the side bars may be folded upon the transverse bars, and a flexible covering material attached to the bars so that the latter may be opened into a semicircular form, said covering material having inwardly-projecting flaps at the bottom adapted to pass under the outermost side and transverse bars and to be held thereby.

3. In a shelter-tent of the character described, radial side bars hinged to a common center, separate transverse bars uniting each pair of these side bars, and flexible inwardly-folding joints whereby the side bars may be folded upon the transverse bars, a flexible covering material so formed and attached to the bars that the latter may be opened into a semicircle about the common pivot of the side bars, and the covering material form an inclosure for the top and sides, said covering material having its lower edge adapted to be turned inward beneath the outer side and transverse bars, which are adapted to lie directly on the ground, and said covering having one or more openings cut in the sides, and an inserted window of open-mesh fabric fixed therein.

In witness whereof I have hereunto set my hand.

ARTHUR D. LLOYD.

Witnesses:
S. H. NOURSE,
JESSIE C. BRODIE.